United States Patent
Müller

[11] 3,712,471
[45] Jan. 23, 1973

[54] FILTER DEVICE

[76] Inventor: Hans Müller, Erlenbach, Zurich, Switzerland

[22] Filed: Nov. 21, 1969

[21] Appl. No.: 878,654

[30] Foreign Application Priority Data

Nov. 22, 1968 Switzerland..........................17544/68
Dec. 16, 1968 Switzerland..........................19106/68
Dec. 16, 1968 Switzerland..........................19107/68

[52] U.S. Cl. .....................210/107, 210/332, 210/86
[51] Int. Cl. ..............................................B01d 29/02
[58] Field of Search..........210/68, 86, 216, 332, 106, 210/107

[56] References Cited

UNITED STATES PATENTS

| | | | |
|---|---|---|---|
| 3,233,734 | 2/1966 | Muller | 210/216 |
| 3,117,233 | 1/1964 | Mittelberger et al. | 210/86 X |
| 3,428,176 | 2/1969 | Reneau, Jr. | 210/86 |
| 3,106,933 | 10/1963 | Kloppel | 210/86 X |
| 3,356,219 | 12/1967 | Muller | 210/332 X |

*Primary Examiner*—Samih N. Zaharna
*Attorney*—Michael S. Striker

[57] ABSTRACT

A housing has mounted rotatably therein an elongated hollow upright shaft carrying one or more superimposed filter elements which are themselves hollow and whose interior communicates with the interior of the shaft so that, when solids-containing liquids are admitted into the housing, the filtrate passes through the filter element into the shaft for evacuation and the solids are retained on the surface of the filter element and form a cake thereon. A control arrangement is provided for controlling the thickness of the filter cake as the same forms on the filter element. The control means includes a radiation detecting device, a radiating emitting device spaced from the detecting device in such a manner that emitted radiation must traverse a predetermined path on its way to the detecting device, and carrying means which mounts the emitting and detecting devices and is movable between two positions in one of which at least a portion of the path extends above the upper surface of the filter element at a predetermined distance from the same corresponding to the desired maximum filter cake thickness, and another of which no portion of the path extends above this upper surface. Automatic means is also disclosed for controlling the operation of the filter device in dependence upon signals generated by the control means.

4 Claims, 4 Drawing Figures

INVENTOR
HANS MÜLLER
BY
ATTORNEY

INVENTOR
HANS MÜLLER
BY
ATTORNEY

FILTER DEVICE

BACKGROUND OF THE INVENTION

The present invention relates generally to a filter device, and more particularly to a filter device provided with means for controlling the thickness of a forming filter cake.

It is already known to construct filter devices utilizing a hollow rotatable shaft extending in an upright housing and carrying a plurality of hallow filter elements projecting transversely to the elongation of the shaft and communicating with the interior of the latter. Thus, when liquid containing solids to be removed by filtration is admitted into the housing, the liquid passes into and through the filter elements and from the same travels as filtrate into the interior of the shaft from which it is evacuated in suitable manner. The retained solids become deposited on the surface of the filter element or elements and form thereon a filter cake whose thickness continues to increase as the filtration progresses.

In these devices the filter cake is to be dislocated from the filter element by centrifugal force. For this purpose the continued inflow of medium to be filtrated into the housing is interrupted at a desired time, and the shaft with its affixed filter elements is rapidly rotated whereby the filter cake is ejected by centrifugal force from the filter elements into the areas of the housing which surround the shaft and filter elements and is then removed from the housing. Such apparatus is disclosed in detail for instance in my prior U.S. Pat. Nos. 3,233,734 and 3,395,801 to which reference may be had for details concerning the construction of the apparatus.

I have found, however, that this type of apparatus is possessed of a certain problem. Specifically, the superimposed filter elements are spaced from one another by a certain predetermined distance and it may or does happen that the filter cake increases in thickness to such an extent as to bridge this spacing between two superimposed ones of the filter elements. When this occurs it initially results in a reduction of liquid flow through the filter cake and the filter element so that the liquid can pass from the interior of the filter element into the shaft as filtrate. Continued filtration and continued increase in the thickness of the filter cake then necessarily results in tight compaction of the filter cake because the latter can no longer increase in thickness, and the result is that when the time comes for removal of the thus compacted filter cake it is either very difficult or even impossible to dislocate the same by centrifugal force. A further problem is the fact that the pressure exerted by the filter cake as the same bridges the gap between two superimposed ones of the filter elements and begins to press against them, the filter elements may be deformed and damaged.

Of course, attempts have been made to provide devices which control the thickness of the filter cake, that is measure the thickness and provide an indication when a predetermined value has been reached. These devices are of a mechanical nature and have been found to be rather susceptible to breakdown. In addition, they are not useful with soft filter cakes because they utilize mechanical feelers which penetrate the filter cake if the same is soft and thus are incapable of measuring its thickness.

SUMMARY OF THE INVENTION

It is, accordingly, an object of the present invention to provide an arrangement of the type in question which is not possessed of the aforementioned disadvantages.

More particularly it is an object of the present invention to provide a filter device with a control arrangement for controlling the thickness of the filter cake as the same forms, which does not have the drawbacks mentioned before.

An additional object of the invention is to provide such a device which is relatively simple in its construction and therefore not expensive.

A concomitant object of the invention is to provide such a device wherein the control arrangement is highly reliable.

Still a further object of the invention is to provide a control arrangement of the type in question which can be readily added to existing filter devices of the type mentioned before, thus extending the range of operation and of reliability of such devices rather than making them obsolete.

In pursuance of the above objects, and others which will become apparent hereafter, one feature of the invention resides, briefly stated, in a filter device for separating solids from liquids which comprises a housing and an elongated hollow upper shaft mounted in the housing for rotation about its axis. At least one hollow filter element is provided on the shaft and has an interior which communicates with the interior of the shaft for passage of the filtrate into the latter, and an upper surface on which the retained solids accummulate and form a filter cake. Feed means feeds a solids-containing liquid in the housing and drive means is provided for intermittently rotating the shaft to thereby effect centrifugal dislocation of the filter cake from the filter element.

Thus far the construction is known, for instance from my aforementioned two U.S. patents.

In accordance with the present invention, however, I provide control means for controlling the thickness of the filter cake forming on the upper surface of the filter element. This control means comprises radiation detecting means and radiation emitting means which is spaced from the detecting means so that emitted radiation traverses a predetermined path intermediate the emitting and detecting means. Further, I provide carrier means which mounts the emitting and detecting means for movement between two positions in one of which at least a portion of the path extends above the upper surface at a predetermined distance from the same which corresponds to the desired maximum thickness of the filter cake, and in the other of which positions no portion of the path extends above the surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
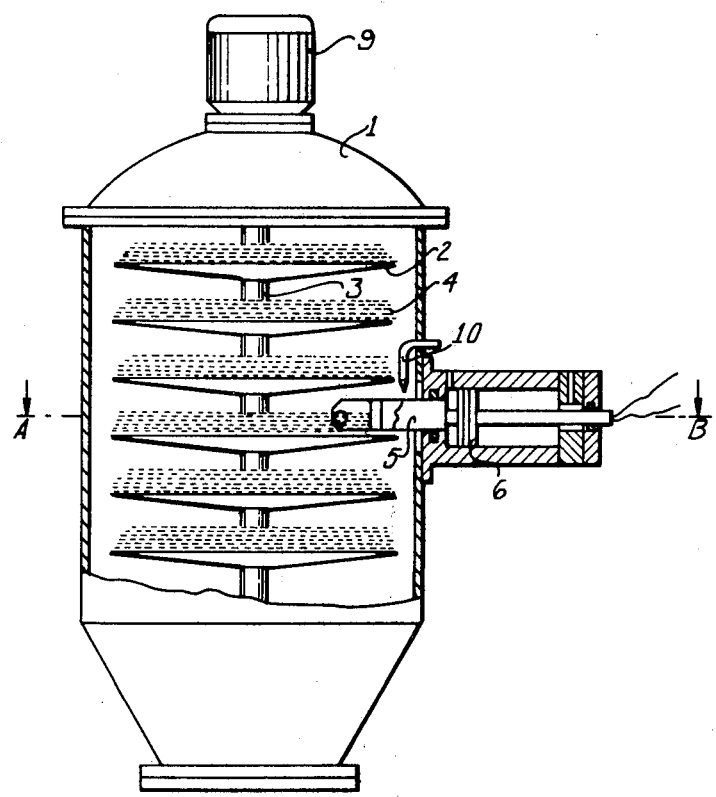
FIG. 1 is a vertical section of a device according to the present invention.
Figure 2:
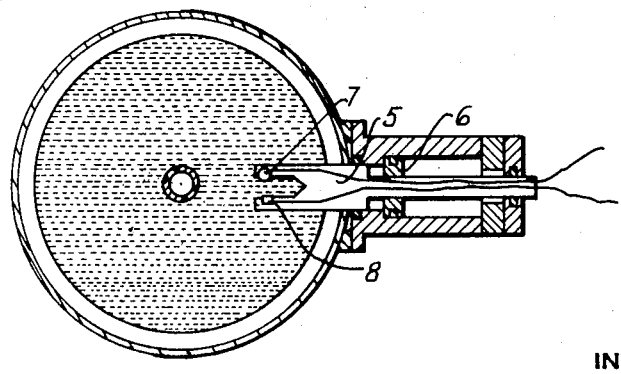
FIG. 2 is a section taken on the line A-B of FIG. 1.

Discussing now the drawing in detail, and firstly the embodiment illustrated in FIGS. 1 and 2 thereof, it will be seen that reference numeral 1 identifies an upright housing through which there extends an upright hollow shaft 3 which is mounted for rotation about its own axis. The shaft 3 carries a plurality of superimposed substantially disc-shaped filter elements 2 which are rigid with the shaft 3 and rotate therewith when the latter is rotated.

Each of the filter elements 2, which may be of the type disclosed in my aforementioned U. S. patents, has a liquid-impermeable dished bottom wall and is provided at its upper open side with a filter surface, for instance consisting of filter fabric, porous sheet material or the like.

A non-illustrated inlet is provided in the housing 1 through which a liquid containing solids is introduced under pressure. The liquid passes through the filter cloth, porous sheet material or the like provided on the individual filter elements 2 to the interior of the latter, flowing along the liquid-impermeable dished bottom wall of the respective filter element in form of filtrate which enters through communication-establishing apertures into the interior of the hollow shaft 3 which latter of course communicates with a suitable outlet for the filtrate. The solids contained in the incoming material to be filtered are retained on the upper filtration surfaces of the filter elements 2 and form a filter cake which continuously increases in thickness as filtration progresses.

In accordance with the present invention I provide control means for controlling the thickness of the filter cake. In FIGS. 1 and 2 this control means is provided approximately midway between the upper and lower ends of the housing 1 at the circumferential wall thereof. In the embodiment of FIGS. 1 and 2 this control means comprises a carrier 5 cooperating with a cylinder and piston arrangement which may be hydraulically, pneumatically or otherwise operated, and which serves to displace the carrier 5 between two positions in which the innermost portion of the carrier 5 respectively is located above the surface of one of the filter elements 2 at a spacing therefrom which corresponds to the permissible maximum thickness of the filter cake, and in the other of which position the innermost portion of the carrier 5 is withdrawn outwardly away from the periphery of the filter element 2 with which it is associated. The innermost portion of the carrier 5 carries a radiation emitting means, here identified as a lightbulb 7, and further a radiation detecting means, here identified as a photocell or photoelectric element 8. The bulb 7 and the element 8 are spaced from one another so that light emitted by the bulb 7 must traverse a predetermined path before it is received or detected by the element 8.

When the innermost portion of the carrier 5 with the bulb 7 and the element 8 is located in the operative position above the surface of the filter element 2 with which it is associated, then the path to be traversed by the emitted light energy from the bulb 7 to the photoelectric element 8 is also located above the surface of the filter element 2, at the distance corresponding to the permissible maximum filter cake thickness.

It will be appreciated that as the filter cake increases in thickness during progress of filtration, it rises in the space between the bulb and the photoelectric element 8—mounted on the innermost end portion of the carrier 5 which end portion is constructed in bifurcated configuration—and impedes the passage of light from the bulb 7 to the photoelectric element 8 to an increasing extent until it has reached a level in which the light energy impinging upon the photoelectric element 8 is so weak that it triggers the generation of the signal—either for alarm or for control purposes—when the electric potential generated by the photoelectric element 8 has reached the predetermined limit value which, in accordance with the well-known state of the art, may of course be adjustable. When this occurs, the piston and cylinder arrangement 6 withdraws the carrier 5 and thereby the bulb 7 and photoelectric element 8 entirely from above the surface of the associated filter element 2, and the drive motor 9 which is operatively connected with the hollow shaft 3 is energized to thereby rapidly rotate the hollow shaft 3 and the filter elements 2, so as to dislocate by influence of centrifugal force the filter cakes which have formed on the respective filter elements 2. It will be appreciated that the formation of filter cakes progresses at the same or approximately the same pace on all of the filter elements so that measurement of the thickness of the filter cake on one of the elements is indicative of the progress of thickness increase of the filter cakes on the other filter elements and therefore is sufficient.

In the embodiment of FIGS. 1 and 2 the forward portions of the bifurcated end portion of the carrier 5, carrying the bulb 7 and the photoelectric element 8 are located below one or more nozzles 10 when the carrier 5 is withdrawn to inoperative position, and a cleaning fluid may be sprayed from the nozzle or nozzles 10— either as a result of manual activation or as a result of automatic control of a valve which is activated by movement of the carrier to its inactive position—onto the housings for the bulbs and photoelectric elements to dislodge any particulate contaminants which may have become deposited on the windows provided in these housings and through which the emitted light passes. It is advantageous to establish an operative connection between the motor 9 and the carrier 5 in such a manner that the motor 9 can be energized to rotate the filter elements 2 and of course the shaft 3 only when the carrier 5 is withdrawn to inoperative position. This avoids the possibility that damage could occur to the carrier and the elements 7, 8. A detailed discussion of how such an operative connection may be established is not believed to be necessary because it is entirely conventional and well-known to those skilled in the art, and because it does not in itself form a part of the present invention.

Figure 3:
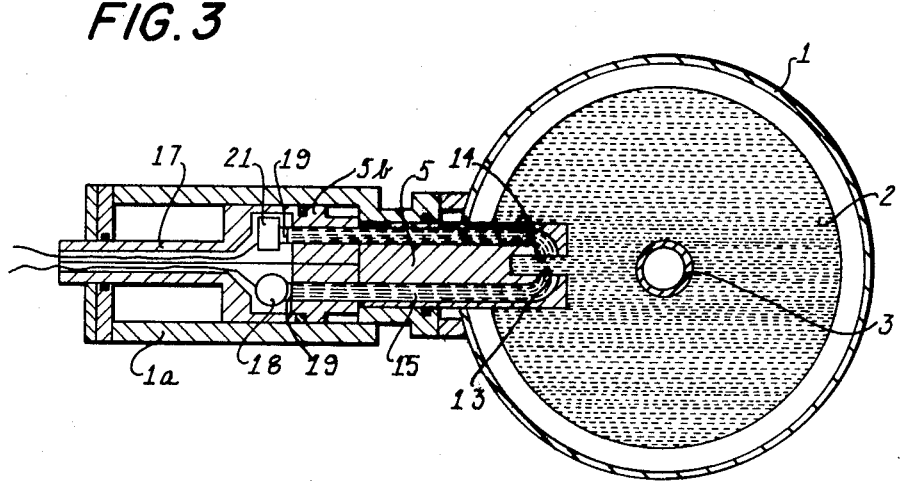
FIG. 3 is a view similar to FIG. 2 but illustrating a further embodiment of the invention.

In the embodiment of FIG. 3 the bulb 18 and the photoelectric element 21 are permanently located exteriorly of the housing 1. If is advantageous under certain circumstances, for instance if the liquid to be filtered and contained in the housing 1 is hot, so that the photoelectric element is not thereby influenced. On the other hand, this construction permits the use of light sources at high temperature without any difficulties, particularly with reference to the material to be filtered which may be susceptible to damage at such high temperatures. Again, the material to be filtered may be corrosive or otherwise have characteristics which could damage the light bulb 18 and/or the photoelectric element 21, a possibility which is avoided in the embodiment of FIG. 3.

As shown in FIG. 3, the carrier is movable transversely to the axis of the housing 1 so that its inner or leading portion 5b moves closer towards and farther away from the axis—which will be frequently coincident with the axis of rotation of the shaft 3—whereas its outer portion 5b is permanently located in a suitable housing 1a outwardly adjacent to and sealed with respect to the housing 1. The inner portion 5b of the carrier 5 is again bifurcated and has two transversely spaced facing surfaces 13 and 14. The outer portion 5b carries the light bulb 18 and the photoelectric element 21. There are further provided two strands 15 and 16 of light conducting elements, such as fiber optics or optical fibers, whose outer ends 19 are respectively juxtaposed with the light-emitting window of the housing for the light bulb 19 and the light-admitting window for the housing of the photoelectric element 21. The inner ends of the strands 15 and 16 are coincident with the surfaces 13, 14 and thus face one another across the gap between the two portion of the bifurcated inner portion 5b of the carrier 5. The principle of fiber optics is well known, namely that when light energy impinges upon one end of such an optical fiber, it is transmitted along the fiber to the opposite end thereof. Accordingly, light emitted by the light bulb 18 is conducted along the fibers of the bundles or strands 15 to be emitted at the surface 13 across the gap of the bifurcation to the surface 14 where it enters the exposed ends of the optical fibers of the bundle 16 and is then conveyed along to the photoelectric 21.

The portion 5a and the portion 17 of the carrier 5 may be pressure tightly encapsulated for explosion protection. Cooling means may be provided to counteract heat emitted by the light bulb 18 and thermostatic means may be provided in associated with the photoelectric element 21 to stabilize the temperature to which the same is subjected. This permits the use of light sources of considerable power, including infrared or ultraviolet radiators and of highly sensitive photoelectric elements, so-called photomultipliers. The operation of the device illustrated in FIG. 3 is of course the same as in FIGS. 1 and 2 insofar as the detection of the permissible filter cake thickness is concerned.

Figure 4:
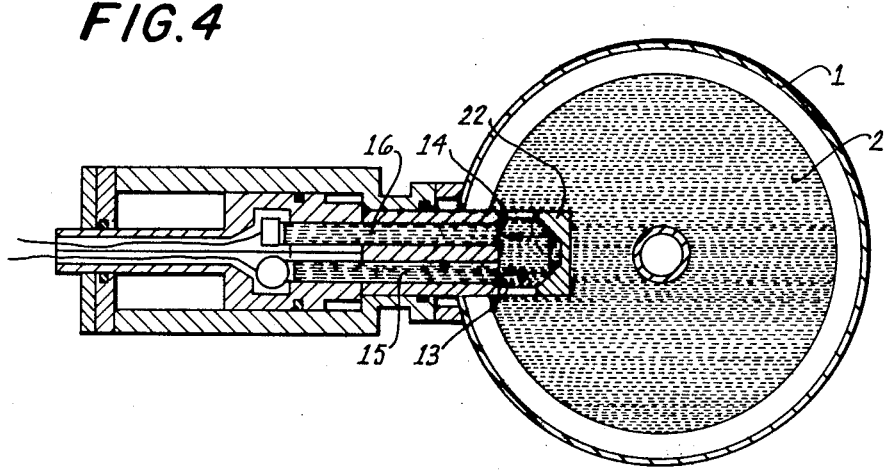
FIG. 4 is a view similar to FIG. 3 illustrating yet an additional embodiment of the invention.

Finally, the embodiment illustrated in FIG. 4 is a variation of the embodiment illustrated in FIG. 3. Like reference numerals identify like elements. Unlike FIG. 3, however, the embodiment of FIG. 4 has the surfaces 13 and 14 facing in one and the same direction, so that accordingly the ends of the fiber optics bundles 15 and 16 which are exposed at the surfaces 13 and 14, also face in one and the same direction. In other words, they are not juxtaposed across a gap as in the case of FIG. 3.

Accordingly, in the embodiment of FIG. 4 there is provided a reflecting member 22, or a member having a reflecting surface, which is juxtaposed with the surfaces 13 and 14 so that light emitted by the exposed ends of the fiber optics bundle 15 at the surface 13 passes in the direction of the associated arrow to impinge upon the reflecting surface of the member 22, and is then reflected back to the exposed ends of the fiber optics bundle 16 exposed at the surface 14, in the direction of the arrow associated with the surface 14. Of course, the member 22 may be configured in a manner other than illustrated. In any case, with the embodiment of FIG. 4 it is possible to obtain the angles of light incidence which are most advantageous for the fiber optics 15 and 16.

In fact, the liquids to be filtered tend to reflect and disperse the light which is emitted into them. This makes it frequently unnecessary in an embodiment such as that in FIG. 4 to provide the member 22. In other words, the dispersed light emitted by the fiber optics bundle 15 at the surface 13 may be bright enough to enter the fiber optics bundle 16 at the surface 14 for conducting to the photoelectric element 21, without the presence of a reflecting member 22. The operation of the device in this case would be the same as previously discussed, and the device would continue to function without interrupting the increase in filter cake thickness until the exposed ends of the fiber optics bundles 15 and 16 at the surfaces 13 and 14 are covered by the increasing thickness of the filter cake, thereby precluding entry of light into the bundle 16 and resulting in the initiation of a signal.

Of course, in the embodiment of FIGS. 3 and 4 the ends of the fiber optics bundles 15 and 16 at the surfaces 13 and 14 must be made fluid-tight either by provision of a glass or plastic window in sealing relationship, or by saturating the ends with a material which sealingly enters between the individual fibers of the fiber optics bundles 15 and 16, in order to prevent the escape of liquid from the housing 1 into the auxiliary housing 1a. In an embodiment analogous to FIG. 4 it is also possible to have the surfaces 13 and 14 be concentric with one another, that is to have the surface 13 with the associated fiber optics bundle 15 be located at the center and be surrounded by the surface 14 in annular configuration, with the associated fiber optics bundle 16 similarly annularly surrounding the fiber optics bundle 15. In this case the two bundles 15 and 16 separate from one another only in the region of the auxiliary housing 1a.

It is natural that in place of light another emitter of radiant energy may be utilized, such as radioactive isotopes, in which case an ionizing chamber is used as a detector. An embodiment based on this particular construction permits a complete encapsulation of that portion of the carrier 5 which is subjected to contact with the contents of the housing 1 or for instance by providing a coating of polyfluo-olefin, so as to protect the device against even highly corrosive liquids. Naturally, instead of imparting to the carrier 5 a shifting movement it may also be displaced between its two positions by a swivelling movement, a tilting movement, a turning movement or other suitable manner without departing from the scope and intent of the invention.

It will be understood that each of the elements described above, or two or more together, may also find a useful application in other types of constructions differing from the types described above.

While the invention has been illustrated and described as embodied in a filter device, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A filter device for separating solids from a liquid, comprising a housing; an elongated hollow upright shaft mounted in said housing for rotation about its axis; at least one hollow filter element on said shaft and having an interior communicating with the interior of said shaft for passage of filtrate into the latter, and an upper surface on which retained solids accummulate and form a filter cake; feed means for feeding a solids-containing liquid into said housing; drive means for intermittently rotating said shaft to thereby effect centrifugal dislocation of said filter cake; control means for controlling the thickness of the filter cake forming on said upper surface, said control means comprising a photoelectric element, a source of light energy spaced from said photoelectric element so that emitted light energy traverses a predetermined path intermediate said photoelectric element and said source, and carrier means mounting said photoelectric element and source for movement between two portions in one of which at least a portion of said path extends above said upper surface at a predetermined distance from the same corresponding to the desired maximum thickness of the filter cake, and in the other of which no portion of said path extends above said upper surface, said carrier means comprising an inner portion and an outer portion which are respectively located within and without said housing, said photoelectric element and source being mounted on said outer portions; and first and second light-conducting optical fiber means each having an outer end section adjacent said source and said photoelectric element, respectively, and an inner end section carried by said inner portions of said carrier means, said inner end sections being spaced from one another and defining between themselves said path.

2. A filter device as defined in claim 1, wherein said inner end sections have respective end surfaces which face one another.

3. A filter device as defined in claim 1, wherein said inner end sections have respective end surfaces which face in a common direction; and further comprising a light-reflective surface slightly spaced from and juxtaposed with said end surfaces so as to define with the same said path.

4. A filter device as defined in claim 1; and further comprising connecting means connecting said feed means, drive means and control means for terminating operation of the former in response to formation of a filter cake to a thickness where said path is interrupted, and for thereupon activating said drive means for centrifugal dislocation of said filter cake in response to movement of said control means to said other of said two positions thereof.

* * * * *